US011362597B2

(12) United States Patent
Yamaguchi et al.

(10) Patent No.: US 11,362,597 B2
(45) Date of Patent: Jun. 14, 2022

(54) POWER CONTROL DEVICE

(71) Applicant: KEIHIN CORPORATION, Tokyo (JP)

(72) Inventors: Nobukatsu Yamaguchi, Sakura (JP);
Yuta Nakamura, Utsunomiya (JP);
Takami Suzuki, Utsunomiya (JP)

(73) Assignee: HITACHI ASTEMO, LTD.,
Hitachinaka (JP)

( * ) Notice: Subject to any disclaimer, the term of this patent is extended or adjusted under 35 U.S.C. 154(b) by 0 days.

(21) Appl. No.: 17/038,589

(22) Filed: Sep. 30, 2020

(65) Prior Publication Data

US 2021/0104956 A1    Apr. 8, 2021

(30) Foreign Application Priority Data

Oct. 2, 2019 (JP) .............................. JP2019-181832

(51) Int. Cl.
H02M 7/537     (2006.01)
B60L 50/51     (2019.01)
H02J 9/06      (2006.01)
H02M 1/00      (2006.01)

(52) U.S. Cl.
CPC ............. H02M 7/537 (2013.01); B60L 50/51 (2019.02); H02J 9/06 (2013.01); B60L 2210/40 (2013.01); H02M 1/00 (2013.01); H02M 1/0009 (2021.05)

(58) Field of Classification Search
CPC ........ H02M 1/00; H02M 7/537; H02M 3/158; H02M 1/0009; H02M 7/53871; H02M 1/322; B60L 2210/40; B60L 50/51; H02J 9/06
See application file for complete search history.

(56) References Cited

U.S. PATENT DOCUMENTS

| 2012/0055727 | A1* | 3/2012  | Omiya ................. B60W 10/26 180/279 |
| 2012/0293138 | A1  | 11/2012 | Kanzaki et al. |
| 2018/0175743 | A1* | 6/2018  | Mizokami ......... H02M 7/53803 |
| 2019/0315335 | A1* | 10/2019 | Inoshita .................. H02P 5/753 |
| 2019/0379220 | A1* | 12/2019 | Ueda ........................ H02J 9/00 |

FOREIGN PATENT DOCUMENTS

| JP | 2011259517 A | 12/2011 |
| JP | 2015073409 A | 4/2015  |
| JP | 2015202020 A | 11/2015 |
| JP | 2018019451 A | 2/2018  |
| JP | 2018107938 A | 7/2018  |
| WO | 2011089723 A1| 7/2011  |

OTHER PUBLICATIONS

JPO Notice of Allowance for corresponding JP Application No. 2019-181832; dated Dec. 22, 2020.

* cited by examiner

Primary Examiner — Jared Fureman
Assistant Examiner — Duc M Pham
(74) Attorney, Agent, or Firm — Cantor Colburn LLP

(57) ABSTRACT

The present power control device includes an inverter, a step-up/down converter, a first capacitor, a second capacitor, and a control device. The step-up/down converter includes an upper arm and a lower arm that are switching elements, and a reactor that has a first end and a second end, the first end being connected to the first capacitor, and the second end being connected between the upper arm and the lower arm. The control device is configured to fix the lower arm in an off state and control the upper arm such that the upper arm switches at a predetermined duty ratio.

6 Claims, 3 Drawing Sheets

POWER CONTROL DEVICE

CROSS REFERENCE TO RELATED APPLICATIONS

The present invention claims priority under 35 U.S.C. § 119 to Japanese Application No. 2019-181832 filed Oct. 2, 2019, the entire content of which is incorporated herein by reference.

BACKGROUND OF THE INVENTION

Field of the Invention

The present invention relates to a power control device.

Description of Related Art

In PCT International Publication No. WO. 2011/089723, a power control device that is mounted in a vehicle, converts DC power from a battery into AC power to supply the AC power to a motor generator, and converts AC power generated by the motor generator into DC power to supply the DC power to the battery is disclosed.

The power control device described above includes a step-up/down converter, a first capacitor, a second capacitor, and a motor electronic control unit (ECU). The step-up/down converter includes two switching elements serving as an upper arm and a lower arm and a reactor, and is provided between a battery and an inverter.

The first capacitor is a smoothing capacitor provided between the battery and the step-up/down converter (on a primary side). The second capacitor is a smoothing capacitor that is provided between the step-up/down converter and the inverter (on a secondary side). The motor ECU controls the upper arm and the lower arm.

Incidentally, when a vehicle stops due to a collision of the vehicle, it is necessary to disconnect a power control device from the battery and promptly consume the residual charge of a second capacitor. Therefore, the motor ECU described above performs control for alternately turning on an upper arm and a lower arm of the step-up/down converter and executes discharge control for discharging the residual charge of the second capacitor.

SUMMARY OF THE INVENTION

However, the residual charge of the second capacitor may flow into the first capacitor and a voltage on the primary side may become an overvoltage due to the discharge control in the power control device described above. As a result, the operation of the step-up/down converter may stop from a viewpoint of device protection in the power control device described above. Therefore, the present inventor has thought about controlling each of the first capacitor and the second capacitor at a predetermined duty ratio such that the voltage on the primary side is maintained at a target value to prevent the voltage on the primary side from becoming an overvoltage. However, in this case, since the power stepped-up by the step-up/down converter may be supplied from the primary side to the secondary side, there is a possibility that a voltage on the secondary side will become an overvoltage. As a result, the residual charge of the second capacitor cannot be discharged.

The present invention has been made in view of such circumstances, and an object thereof is to provide a power control device capable of suppressing voltages on the primary side and the secondary side from becoming an overvoltage, and discharging residual charge of the second capacitor.

(1) One aspect of the present invention is a power control device of a vehicle that has an electric motor, a first DC power supply, and a second DC power supply includes: an inverter configured to drive the electric motor; a step-up/down converter configured to perform a step-up operation of stepping up power from the first DC power supply and supplying the power to the inverter and a step-down operation of stepping down power from the inverter and supplying the power to the first DC power supply; a first capacitor that is provided between the first DC power supply and the step-up/down converter; a second capacitor that is provided between the step-up/down converter and the inverter; and a control device configured to execute discharge control for discharging residual charge of the second capacitor when power is supplied from the second DC power supply and a collision of the vehicle has occurred, wherein the step-up/down converter includes: an upper arm and a lower arm that are switching elements; and a reactor that has a first end and a second end, the first end being connected to the first capacitor, and the second end being connected between the upper arm and the lower arm, and wherein the control device is configured to fix the lower arm in an off state and control the upper arm such that the upper arm switches at a predetermined duty ratio, as the discharge control.

(2) In the power control device of (1) described above, an auxiliary device of the vehicle may be connected between the first DC power supply and the step-up/down converter.

(3) The power control device of (1) or (2) described above may further include a backup power supply configured to supply power stored in the first capacitor to the control device when a power supply from the second DC power supply to the control device is stopped.

(4) The power control device of any one of (1) to (3) described above may be configured as follows to further include a voltage sensor configured to measure an inter-terminal voltage of the first capacitor, in which the control device is configured to calculate a predetermined duty ratio on the basis of the inter-terminal voltage measured by the voltage sensor and a first target value that is a target value of the inter-terminal voltage.

(5) The power control device of (4) described above may be configured as follows to further include a current sensor configured to measure a current flowing through the reactor, in which the control device is configured to calculate a second target value that is a target value of the current on the basis of a difference between the inter-terminal voltage measured by the voltage sensor and the first target value, and calculate the predetermined duty ratio such that the current measured by the current sensor becomes the second target value.

As described above, according to each aspect of the present invention described above, it is possible to provide a power control device capable of suppressing voltages on a primary side and a secondary side from becoming overvoltages, and discharging the residual charge of the second capacitor.

DETAILED DESCRIPTION OF THE INVENTION

Figure 1:
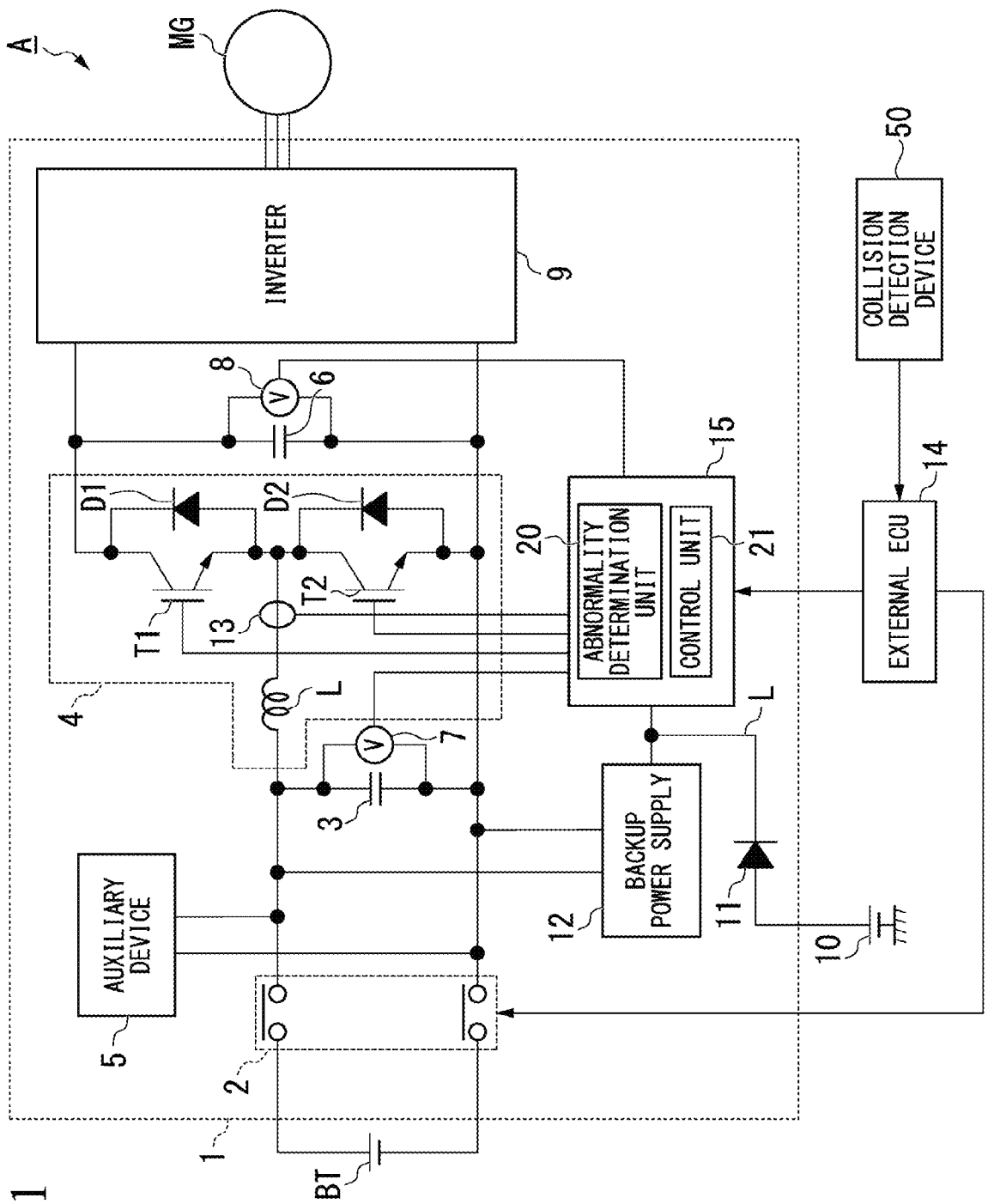
FIG. 1 is a block diagram which shows a configuration of a vehicle A including a power control device according to an embodiment of the present invention.

A power control device according to an embodiment of the present invention will be described using the drawings in the following description. FIG. 1 is a block diagram which shows a configuration of a vehicle A that includes a power control device according to the embodiment. Note that the vehicle A shown in FIG. 1 is, for example, a hybrid vehicle or an electric vehicle.

As shown in FIG. 1, the vehicle A includes a battery BT, a motor generator MG, and a power control device 1.

The battery BT is, for example, a rechargeable secondary battery such as a lithium ion battery.

The motor generator MG is an AC rotating electric machine. For example, the motor generator MG is used as a generator driven by an engine (not shown) of the vehicle A and is also used as an electric motor for starting the engine. The motor generator mainly operates as an electric motor and drives wheels (not shown) of the vehicle A. On the other hand, when the vehicle A is being braked or the acceleration on a downward slope is being reduced, the motor generator MG operates as a generator and regenerates generated power (hereinafter, referred to as "regenerative power") to the power control device 1.

The power control device 1 converts DC power from the battery BT into AC power and supplies the AC power to a motor generator MG. In addition, the power control device 1 also converts regenerative power, which is AC power generated by the motor generator MG, into DC power, and supplies it to the battery BT.

When a collision of the vehicle A has occurred, the power control device 1 executes discharge control for discharging residual charge of a smoothing capacitor (at least residual charge of the second capacitor 6) provided in the power control device 1.

Hereinafter, a schematic configuration of the power control device 1 according to the present embodiment will be described.

The power control device 1 according to the present embodiment includes a contactor 2, a first capacitor 3, a step-up/down converter 4, an auxiliary device 5, a second capacitor 6, a first voltage sensor 7, a second voltage sensor 8, an inverter 9, a control power supply 10, a diode 11, a backup power supply 12, a current sensor 13, and a motor electronic control unit (ECU) 15. Note that the motor ECU 15 is an example of a "control device" of the present invention.

The contactor 2 connects the battery BT and the step-up/down converter 4 or releases a connection between the battery BT and the step-up/down converter 4 under control of the external ECU 14.

The first capacitor 3 is a smoothing capacitor provided on the primary side (a battery BT side) of the step-up/down converter 4. That is, the first capacitor 3 is provided between the battery BT and the step-up/down converter 4.

The step-up/down converter 4 includes a reactor L, switching elements T1 and T2 connected in series, and diodes D1 and D2 connected in parallel in a direction opposite to the switching elements T1 and T2.

The reactor L has a first end and a second end. The first end of the reactor L is connected to the contactor 2 and the first capacitor 3. The second end of the reactor L is connected between a switching element T1 (an upper arm) and a switching element T2 (a lower arm). Note that an insulated gate bipolar transistor (IGBT) or a field effective transistor (FET) can be used as the switching elements T1 and T2.

The step-up/down converter 4 performs a step-up operation that steps up power from the battery BT (the first DC power supply) and supplies it to the inverter 9 or performs a step-down operation that steps down power from the inverter 9 and supplies it to the battery BT by turning on or off the switching elements T1 and T2 under control of the motor ECU 15.

The auxiliary device 5 is connected to the primary side of the step-up/down converter 4. That is, the auxiliary device 5 is connected between the contactor 2 and the first end of the reactor L. When the contactor 2 is open (in an open state) and the connection between the battery BT and the step-up/down converter 4 is released, the auxiliary device 5 operates by using power stored in the first capacitor 3 as an operation source.

The second capacitor 6 is a smoothing capacitor provided on the secondary side (the inverter 9 side) of the step-up/down converter 4. That is, the second capacitor 6 is provided between the step-up/down converter 4 and the inverter 9.

The first voltage sensor 7 is a sensor that is attached between both terminals of the first capacitor 3, and measures a voltage value Vc1 between both terminals of the second capacitor 6 (hereinafter, referred to as an "inter-terminal voltage value Vc1"). The first voltage sensor 7 outputs the measured inter-terminal voltage value Vc1 to the motor ECU 15.

The second voltage sensor 8 is a sensor that is attached between both terminals of the second capacitor 6, and measures a voltage value Vc2 between both terminals of the second capacitor 6 (hereinafter, referred to as an "inter-terminal voltage value Vc2"). The second voltage sensor 8 outputs the measured inter-terminal voltage value Vc2 to the motor ECU 15.

The inverter 9 rotationally drives the motor generator MG of the vehicle A. The inverter 9 converts the DC power supplied from the step-up/down converter 4 into AC power and supplies the AC power to the motor generator MG. In addition, the inverter 9 also converts the regenerative power regenerated from the motor generator MG into DC power and supplies the DC power to the step-up/down converter 4. Note that the inverter 9 may be controlled by the motor ECU 15.

The control power supply 10 (a second DC power supply) is a DC power supply that supplies power to the motor ECU 15 via a power supply line L. Specifically, the control power supply 10 is a power supply of the motor ECU 15 and supplies a control voltage, which is an operation source of the motor ECU 15, to the motor ECU 15. Note that a secondary battery such as a nickel hydrogen battery or a lithium ion battery can be used as the control power supply 10. In addition, an electric double layer capacitor can be used as the control power supply 10 instead of the secondary battery.

The diode 11 has an anode connected to a positive terminal of the control power supply 10 and a cathode connected to the motor ECU 15. This diode 11 is a diode for preventing a backflow.

The backup power supply 12 is a backup power supply of the control power supply 10. The backup power supply 12 generates a backup voltage Va that is a voltage at which the motor ECU 15 can operate and supplies the backup voltage Va to the motor ECU 15 using power stored in the first capacitor 3. For example, the backup power supply 12 supplies the power stored in the first capacitor 3 as an operation power of the motor ECU 15. For example, the backup power supply 12 may include a DCDC converter. Note that the backup power supply 12 constantly supplies the backup voltage Va to the motor ECU 15.

The current sensor 13 measures a current value IL flowing through a reactor L, and outputs the measured current value IL to the motor ECU 15.

The external ECU 14 performs charge/discharge control of the battery BT and control of the contactor 2. Specifically, when an abnormality of the vehicle A (for example, a battery abnormality, a collision of the vehicle A, or the like) has occurred, or when ignition is turned off, the external ECU 14 controls the contactor 2 to release the connection between the battery BT and the step-up/down converter 4, and outputs a discharge command signal to the motor ECU 15. For example, the external ECU 14 may detect the collision of the vehicle A according to a collision detection signal from a collision detection device (for example, a supplemental restraint system) mounted in the vehicle A.

The motor ECU 15 controls a rotation of the motor generator MG by controlling driving of the step-up/down converter 4 and the inverter 9. The motor ECU 15 controls a step-up operation and a step-down operation of the step-up/down converter 4 by controlling switching of each of the switching elements T1 and T2 of the step-up/down converter 4. In addition, the motor ECU 15 receives a discharge command signal output from the external ECU 14 and starts discharge control for rapidly discharging electric charges stored in at least the second capacitor 6 when the collision of the vehicle A has occurred.

This discharge control is control for causing the step-up/down converter 4 to operate only in the step-down operation to discharge the electric charges stored in at least the second capacitor 6 among the first capacitor 3 and second capacitor 6 by fixing the switching element T2 (the lower arm) to be in an off state and controlling the switching of the switching element T1 (the upper arm) at a predetermined duty ratio D.

Note that a power supply of this motor ECU 15 is the control power supply 10 and the backup power supply 12. The motor ECU 15 may also be configured by a microprocessor such as a central processing unit (CPU) or a microprocessing unit (MPU), a micro controller such as a memory control unit (MCU), or the like.

Figure 2:
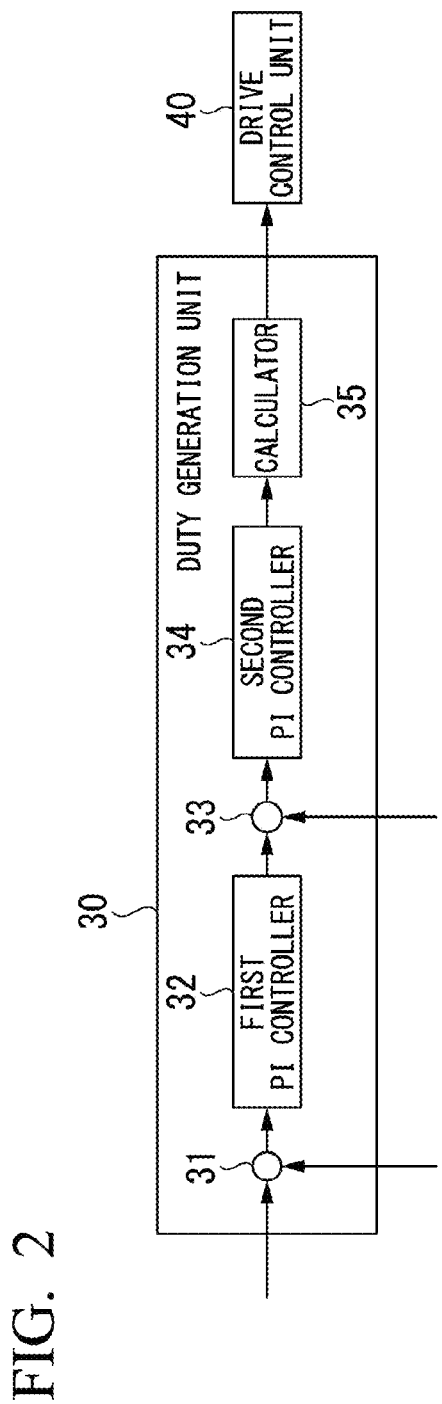
FIG. 2 is a block diagram which shows a functional unit for performing discharge control of a control unit 21 according to the embodiment.

In the following description, a functional unit for performing the discharge control of the control unit 21 according to the present embodiment will be described using FIG. 2. FIG. 2 is a block diagram that shows the functional unit for performing the discharge control of the control unit 21 according to the present embodiment.

The control unit 21 includes a duty generation unit 30 and a drive control unit 40.

The duty generation unit 30 includes a first deviation device 31, a first PI controller 32, a second deviation device 33, a second PI controller 34, and a calculator 35.

The first deviation device 31 acquires the inter-terminal voltage value Vc1 measured by the first voltage sensor 7 from the first voltage sensor 7. In addition, the first deviation device 31 reads a target voltage value $V_M$ (a first target value) stored in a storage unit (for example, a non-volatile memory) of the motor ECU 15. This target voltage value $V_M$ is a target value of the inter-terminal voltage of the first capacitor 3. Then, the first deviation device 31 calculates a difference ΔV between the inter-terminal voltage value Vc1 acquired from the first voltage sensor 7 and the read first target value $V_{M1}$. Then, the first deviation device 31 outputs the calculated difference ΔV to the first PI controller 32.

The first PI controller 32 calculates a target current value $I_M$ (a second target value) that is a target value of a current IL flowing through the reactor L by the first deviation device 31 applying proportional-integral (PI) control to the calculated difference ΔV. Then, the first PI controller 32 outputs the calculated target current value $I_M$ to the second deviation device 33.

The second deviation device 33 acquires the current IL measured by the current sensor 13 from the current sensor 13. In addition, the second deviation device 33 acquires the target current value $I_M$ from the first PI controller 32. Then, the second deviation device 33 calculates a difference ΔI between the current IL measured by the current sensor 13 and the target current value $I_M$. Then, the second deviation device 33 outputs the calculated difference ΔI to the second PI controller 34.

The second PI controller 34 calculates a command value such that the current IL flowing through the reactor L becomes the target current value $I_M$ by applying PI control to the difference ΔI calculated by the second deviation device 33. Then, the second PI controller 34 outputs the calculated command value to the calculator 35.

The calculator 35 calculates a duty ratio D according to a command value from the second PI controller 34, and generates a pulse width modulation (PWM) signal of this duty ratio D. That is, the calculator 35 calculates the duty ratio D such that the current IL measured by the current sensor 13 becomes the target current value $I_M$.

The drive control unit 40 controls the switching of the switching element T1 at the duty ratio D calculated by the calculator 35 by outputting the PWM signal generated by the calculator 35 to a control terminal of the switching element T1 (the upper arm).

Figure 3:
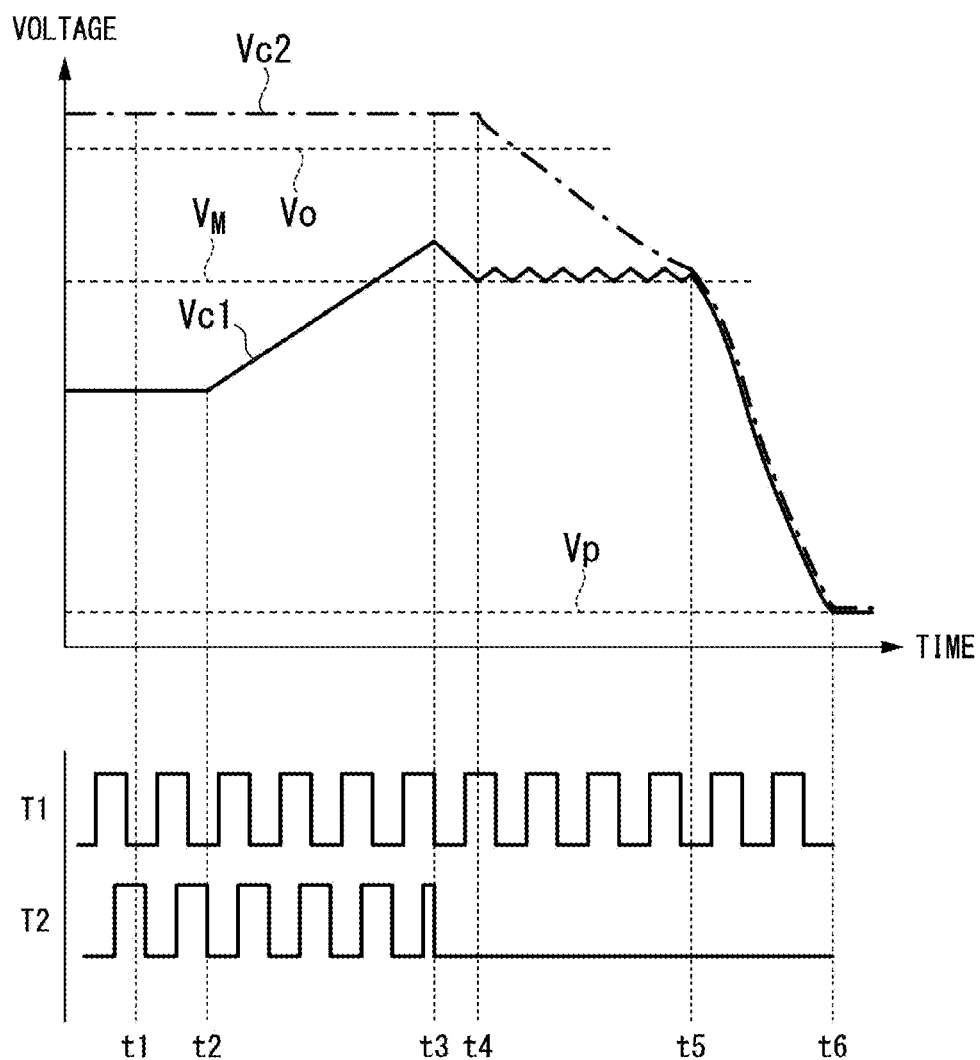
FIG. 3 is a graph which shows discharge control of a power control device 1 according to the embodiment, in which a horizontal axis represents time and a vertical axis represents a voltage.

Next, a flow of discharge control of the power control device 1 according to the present embodiment will be described using FIG. 3. FIG. 3 is a diagram which shows the discharge control of the power control device 1 according to the present embodiment.

As an initial condition, the power control device 1 acquires power from the battery BT via the contactor 2 in a closed state. The motor ECU 15 controls the switching of each of the switching element T1 and the switching element T2 at the same duty ratio. As a result, the step-up/down converter 4 rotationally drives the motor generator MG by stepping up the power from the battery BT and supplying this stepped-up power to the inverter 9. In this case, power is stored in the first capacitor 3 using the power from the battery BT. Power is stored in the second capacitor 6 by the power stepped-up by the step-up/down converter 4. Here, the control power supply 10 supplies power to the motor ECU 15 via the diode 11. The backup power supply 12 steps-down the power from the first capacitor 3 and supply it to the motor ECU 15.

As shown in FIG. 3, it is assumed that the collision of the vehicle A has first occurred at a time t1. In this case, the collision detection device 50 detects the collision of vehicle A and performs control such that the contactor 2 is in an open state at a time t2 after a predetermined time has elapsed from the time t1 to release the connection between the battery BT and the step-up/down converter 4. As a result, the supply of power from the battery BT to the step-up/down converter 4 is stopped.

Here, if the connection between the battery BT and the step-up/down converter 4 is released, power is supplied from the first capacitor 3 to the auxiliary device 5 and the backup power supply 12. However, when the motor generator MG is in a rotating state, the regenerative power generated in the motor generator MG is stepped-down by the step-up/down converter 4 and supplied to the first capacitor 3. Therefore, the inter-terminal voltage value Vc1 of the first capacitor 3 may gradually increase from the time t2.

If the motor ECU 15 receives a discharge command signal from the external ECU 14 at a time t3, the motor ECU 15 fixes the switching element T2 (the lower arm) to be in an off state, and executes discharge control for controlling the switching of the switching element T1 (the upper arm) at the duty ratio D such that the current IL measured by the current sensor 13 becomes the target current value $I_M$. As a result, the inter-terminal voltage value Vc1 of the first capacitor 3 is maintained at the target voltage value $V_M$ lower than an overvoltage value Vo, and the step-up operation by the step-up/down converter 4 is limited. This suppresses over-voltages on the primary side and the secondary side.

Note that a transfer of electric charges from the second capacitor 6 to the first capacitor 3 is not performed when the inter-terminal voltage value Vc1 of the second capacitor 6 exceeds the target voltage value $V_M$. In this case, power is supplied from the first capacitor 3 to the auxiliary device 5 and the backup power supply 12, and the inter-terminal voltage value Vc1 of the first capacitor 3 is decreased. Note that the control unit 21 may drive the inverter 9 and discharge a part of the power stored in the second capacitor 6 to the motor generator MG (hereinafter, referred to as "motor load discharge") via the inverter 9. In addition, when the inter-terminal voltage value Vc1 is higher than an inter-terminal voltage value Vc2 due to this motor load discharge, power is discharged from the first capacitor 3 to the motor generator MG via the diode D1.

If the inter-terminal voltage value Vc1 of the first capacitor 3 falls below the target voltage value $V_M$ at a time t4, electric charges of the second capacitor 6 move to the first capacitor 3. As a result, the inter-terminal voltage value Vc2 of the second capacitor 6 decreases while the inter-terminal voltage value Vc1 of the first capacitor 3 is maintained at the target voltage value $V_M$. Then, at a time t5, electric charges move from the first capacitor 3 to the second capacitor 6 if the inter-terminal voltage value Vc1 is larger than the inter-terminal voltage value Vc2, and electric charges move from the second capacitor 6 to the first capacitor 3 if the inter-terminal voltage value Vc2 is larger than the inter-terminal voltage value Vc1. Therefore, the inter-terminal voltage value Vc1 and the inter-terminal voltage value Vc2 gradually decrease after the time t5, and the electric charges stored in the first capacitor 3 and the second capacitor 6 are discharged. Then, when the inter-terminal voltage value Vc1 and the inter-terminal voltage value Vc2 fall to a predetermined value Vp at time t6, the motor ECU 15 may stop the discharge control. Moreover, the control unit 21 may stop the discharge control when the discharge command signal from the external ECU 14 disappears.

As described above, although one embodiment of the present invention has been described above in detail with reference to the drawings, a specific configuration is not limited to this embodiment, and a design and the like are included within a range not departing from the gist of the invention. Therefore, for example, a modified example to be described below can also be adopted.

Modified Example

The power control device 1 of the embodiment described above may not include a control power supply 10 and a diode 11 in the configuration.

As described above, the motor ECU 15 fixes the switching element T2 (the lower arm) to be in the off state and controls the switching of the switching element T1 (the upper arm) at the predetermined duty ratio D, as the discharge control.

According to such a configuration, it is possible to suppress voltages on the primary side and the secondary side from becoming over-voltages and discharge the residual charge of the second capacitor.

In addition, the auxiliary device 5 may be connected to the primary side of the step-up/down converter 4 described above. With such a configuration, it is possible to suppress a voltage on the primary side from becoming an overvoltage due to electric charges of the first capacitor 3 being discharged. As a result, the discharge control can be executed without stopping an operation of the step-up/down converter 4 from a viewpoint of device protection.

Note that all or a part of the motor ECU 15 described above may also be realized by a computer. In this case, the computer may include a processor such as a central processing unit (CPU) and a graphics processing unit (GPU), and a computer-readable recording medium. Then, a program for realizing all or a part of functions of the motor ECU 15 using a computer is recorded in the computer-readable recording medium, and the program recorded in the recording medium may be realized by causing the processor to read and execute it. Here, the "computer-readable recording medium" refers to a portable medium such as a flexible disk, a magneto-optical disc, a ROM, or a CD-ROM, a storage device such as a hard disk embedded in a computer system. Furthermore, the "computer-readable recording medium" may include a medium that dynamically holds a program for a short time, like a communication line in the case of transmitting the program via a network such as the Internet or a communication line such as a telephone line, and a medium that holds the program for a certain period of time, like a volatile memory inside the computer system that serves as a server or a client in this case. In addition, the program may be a program for realizing a part of the functions described above, or furthermore, may be a program that can realize the functions described above in combination with a program already recorded in the computer system, and may be a program realized by using a programmable logic device such as a field programmable gate array (FPGA).

According to the present invention, it is possible to provide a power control device capable of suppressing voltages on the primary side and the secondary side from becoming over-voltages and discharging residual charge of the second capacitor. Therefore, there is high industrial applicability.

EXPLANATION OF REFERENCES

1 Power control device
2 Contactor
3 First capacitor
4 Step-up/down converter
5 Auxiliary device
6 Second capacitor 7 First voltage sensor
8 Second voltage sensor
15 Motor ECU (control device)
T1 Switching element (upper arm)
T2 Switching element (lower arm)

What is claimed is:

1. A power control device of a vehicle that has an electric motor, a first DC power supply, and a second DC power supply, the power supply control device comprising:
    an inverter configured to drive the electric motor;
    a step-up/down converter configured to perform a step-up operation of stepping up power from the first DC power supply and supplying the power to the inverter and a step-down operation of stepping down power from the inverter and supplying the power to the first DC power supply;
    a first capacitor that is provided between the first DC power supply and the step-up/down converter;
    a second capacitor that is provided between the step-up/down converter and the inverter; and
    a control device configured to execute discharge control for discharging residual charge of the second capacitor when power is supplied from the second DC power supply and a collision of the vehicle has occurred,
    wherein the step-up/down converter includes:
    an upper arm and a lower arm that are switching elements; and
    a reactor that has a first end and a second end, the first end being connected to the first capacitor, and the second end being connected between the upper arm and the lower arm, and
    wherein the control device is configured to fix the lower arm in an off state and control the upper arm such that the upper arm switches at a predetermined duty ratio, as the discharge control.

2. The power control device according to claim 1, wherein an auxiliary device of the vehicle is connected between the first DC power supply and the step-up/down converter.

3. The power control device according to claim 1, further comprising:
    a backup power supply configured to supply power stored in the first capacitor to the control device when a power supply from the second DC power supply to the control device is stopped.

4. The power control device according to claim 1, wherein the control device controls an inter-terminal voltage of the first capacitor to be less than an overvoltage value by controlling the predetermined duty ratio.

5. A power control device of a vehicle that has an electric motor, a first DC power supply, and a second DC power supply, the power supply control device comprising:
    an inverter configured to drive the electric motor;
    a step-up/down converter configured to perform a step-up operation of stepping up power from the first DC power supply and supplying the power to the inverter and a step-down operation of stepping down power from the inverter and supplying the power to the first DC power supply;
    a first capacitor that is provided between the first DC power supply and the step-up/down converter;
    a second capacitor that is provided between the step-up/down converter and the inverter;
    a control device configured to execute discharge control for discharging residual charge of the second capacitor when power is supplied from the second DC power supply and a collision of the vehicle has occurred: and
    a voltage sensor configured to measure an inter-terminal voltage of the first capacitor,
    wherein the step-up/down converter includes:
    an upper arm and a lower arm that are switching elements; and
    a reactor that has a first end and a second end, the first end being connected to the first capacitor, and the second end being connected between the upper arm and the lower arm,
    wherein the control device is configured to fix the lower arm in an off state and control the upper arm such that the upper arm switches at a predetermined duty ratio, as the discharge control, and
    wherein the control device is configured to calculate a predetermined duty ratio on the basis of the inter-terminal voltage measured by the voltage sensor and a first target value that is a target value of the inter-terminal voltage.

6. A power control device of a vehicle that has an electric motor, a first DC power supply, and a second DC power supply, the power supply control device comprising:
    an inverter configured to drive the electric motor;
    a step-up/down converter configured to perform a step-up operation of stepping up power from the first DC power supply and supplying the power to the inverter and a step-down operation of stepping down power from the inverter and supplying the power to the first DC power supply;
    a first capacitor that is provided between the first DC power supply and the step-up/down converter;
    a second capacitor that is provided between the step-up/down converter and the inverter;
    a control device configured to execute discharge control for discharging residual charge of the second capacitor when power is supplied from the second DC power supply and a collision of the vehicle has occurred: and
    a current sensor configured to measure a current flowing through the reactor,
    wherein the step-up/down converter includes:
    an upper arm and a lower arm that are switching elements; and
    a reactor that has a first end and a second end, the first end being connected to the first capacitor, and the second end being connected between the upper arm and the lower arm, and
    wherein the control device is configured to fix the lower arm in an off state and control the upper arm such that the upper arm switches at a predetermined duty ratio, as the discharge control,
    wherein the control device is configured to
    calculate a second target value that is a target value of the current on the basis of a difference between the inter-terminal voltage measured by the voltage sensor and the first target value, and
    calculate the predetermined duty ratio such that the current measured by the current sensor becomes the second target value.

* * * * *